Patented Apr. 7, 1942

2,278,709

UNITED STATES PATENT OFFICE 2,278,709

MANUFACTURE OF TITANIUM DIOXIDE PIGMENTS

Walter G. Moran, Woodbridge, N. J., assignor to National Lead Company, New York, N. Y., a corporation of New Jersey No Drawing. Application July 2, 1940,
Serial No. 343,533

6 Claims. (Cl. 75—115)

The present invention relates to the manufacture of pigments, particularly titanium dioxide pigments and has for its principal object, among others, the effecting of economies in said manufacture.

In the current processes for the manufacture of titanium dioxide pigments, a titaniferous ore, e. g., ilmenite, is reacted with strong sulfuric acid in what is termed "the digestion." The reaction cake is then dissolved in aqueous medium, and unreacted ore and other solid matter removed from the solution which is subsequently hydrolyzed. The hydrolysis which yields a precipitate of hydrous titanium oxide leaves a mother liquor of spent, relatively dilute sulfuric acid containing some small amount of titanium.

The present invention relates to the economical utilization of (a) the unreacted ore recovered after dissolution of the digestion cake; (b) the spent, relatively dilute sulfuric acid obtained from the hydrolysis; and, (c) the titanium contained in the waste acid. In the manufacture of titanium dioxide pigments as heretofore practiced only about 88 per cent of the available titanium dioxide contained in the ore was recovered as precipitated hydrous titanium oxide. By means of the present invention the recovery can be raised to over 91 per cent.

In its broadest aspect the invention contemplates admixing with the recovered, unreacted solids resulting from a digestion reaction, sufficient spent, diluted sulfuric acid obtained from the hydrolysis reaction or other aqueous medium to form a freely-flowing slurry and subsequently incorporating this slurry with a new digestion batch of titaniferous ore and strong sulfuric acid. In addition to the utilization of heretofore discarded materials, there also results from the practice of the present invention an economical saving of steam which is required to "set-off" the digestion. It has been found, in practicing the invention, that considerable heat is evolved due to the dilution of the strong sulfuric acid by the weaker, spent acid and that this evolved heat of dilution is sufficient to raise the temperature of the reaction mass to such an extent that only a small amount of additional heat, either externally applied, or internally injected as live steam, need be supplied in order to initiate the reaction which, because of its exothermic nature, then maintains itself to completion. This is contrary to the accepted principles of this art according to which it was deemed necessary, in order to permit the exothermic reaction to occur and to insure completeness of reaction, to use very strong acid of the order of 99 per cent $H_2SO_4$ and it has even been proposed to use oleum. Yet, according to the present invention there takes place a considerable dilution of the strong acid without either preventing the exothermic reaction from taking place or cutting down the completeness thereof.

In proceeding according to the invention a digestion cake resulting from the reaction between titaniferous ore and sulfuric acid is dissolved in the known manner. Reducing agents may be employed at this stage to reduce the ferric iron to ferrous condition and clarifying agents may also be added to the solution to assist in the sedimentation of the solid undissolved residues. The supernatant liquor may then be drawn off and hydrolyzed, while the settled layer is filtered, if desired, for instance, on a rotary filter, as is usual in the art. The filter cake thus obtained which contains the unreacted ore particles is made up of about 50 per cent solids. It is now repulped preferably with spent acid from a previous hydrolysis. It is obvious, of course, that the sedimented sludge may be used directly without filtration. However, the filtration step is preferred, since this permits use of greater amounts of weak or waste acid. This acid will usually run about 20-25 per cent $H_2SO_4$ more or less but its strength is not of particular consequence in practicing the invention. The amount of acid used in this step may vary but it will be found that in order to secure a freely flowing slurry a quantity will be required which will reduce the concentration of solids to about 32 per cent. Obviously, if a thinner slurry is desired, for instance, to meet with pumping and circulation requirements more acid may be employed. When the slurry has been prepared it is desirable to pump it into a storage vat and to mix with it slurries from several repulping operations of digestion cake solids and spent acid. Storing the slurries takes care of fluctuations in operating schedules and serves to iron out variations in the repulped batches.

The slurry may be withdrawn from the storage vat for use as desired. In practicing the invention, strong acid, ore and slurry are mixed in a suitable reaction vessel. Preferably, the desired amount of strong sulfuric acid is measured into the digestion tank, the ore is next added under agitation followed by the addition of the slurry.

In considering the quantities of ore and strong sulfuric acid to be used in practicing the present invention the same general considerations will apply as in the prior art. The quantity of acid used will be based on the content of titanium in the ore and for every part of titanium, calculated as $TiO_2$, between about 2.5 and 4 parts acid, calculated as 100 per cent $H_2SO_4$ will be employed. The strength of the acid may vary somewhat but will usually be above about 95 per cent $H_2SO_4$. In practicing the invention, however, where spent acid is employed to prepare the slurry that amount of acid supplied by the slurry will be deducted from the amount of strong acid used. Thus, a further economical advantage in saving of concentrated acid is effected:

Example 1

Into a suitable reaction vessel equipped with steam inlet connection and means for agitation with air, about 36,000 pounds of 99 per cent sulfuric acid were measured. About 20,000 pounds of ground ilmenite ore containing about 55 per cent titanium, calculated as $TiO_2$ were added with agitation. About 60 cubic feet of slurry, sp. gr. 1.67, about 6,000 lbs., of digestion residues and spent sulfuric acid were then pumped into the tank, which procedure took about eight minutes. The slurry had the following composition:

|  | Per cent |
|---|---|
| Solids | 32 |
| $TiO_2$ in solids | 55 |
| Solution: |  |
| $TiO_2$ in solution | About 2 |
| Acid in solution | About 18 |
| $FeSO_4$ in solution | About 10 |
| Water | About 70 |

The addition of the slurry produced a rise in temperature of about 50° by heat of dilution. Immediately upon completion of the slurry additional steam was turned on to initiate the exothermic reaction which was complete in from 10 to 15 minutes.

The quantity of residue-spent acid sludge used should not exceed to such an amount as to reduce the acid strength in the reaction mixture materially below 85 per cent $H_2SO_4$.

The resulting digestion cake was dissolved, the solution was reduced, clarified and filtered in the usual manner. The filter cake, made up of about 50 per cent solids was repulped with waste sulfuric acid from a previous hydrolysis. The resulting slurry contained about 32 per cent solids and was pumped to a storage vat for use in a subsequent digestion.

When proceeding according to the foregoing example about 75 per cent of the solids resulting from a digestion may be recirculated. It is evident that complete circulation is not practicable because of the build-up of silica and other insoluble materials which would take place.

The advantages of recirculating the digestion solids as a slurry lie in that there is thereby afforded a uniform distribution of the solids throughout the reacting mass as compared with the addition of the filter cake which remains in relatively large agglomerates which are not efficiently attacked in the digestion. Furthermore, no special conveying system is necessary but the regular system of pumps, circulation pipes and vats may be used and, in addition, a better and positive measurement of recovered yields is achieved.

It is possible to practice the present invention without employing the waste acid hydrolysis mother liquor. Dilute sulfuric acid may be employed and, in fact, even water alone, but in the latter case more strong acid should be used to compensate for that which would have been added with the weak acid. For instance, if water had been employed in the foregoing example some additional 1,400 pounds of 99 per cent acid would have been required.

I claim:
1. Method for solubilizing titaniferous ores which comprises heating ground titaniferous ore with concentrated sulfuric acid, dissolving the resulting reaction mass in aqueous media, separating undissolved residues from the resultant solution, hydrolyzing the solution, admixing the separated residues with sufficient of the spent acid hydrolysis mother liquor to form a free-flowing slurry and returning said slurry to a subsequent ore-concentrated acid mixture prior to initiating the reaction between the said ore and concentrated acid, the proportions of ore, concentrated acid and slurry being such that a non-fluid reaction mass is obtained.

2. Method of solubilizing titaniferous ores which comprises adding to a ground titaniferous ore-concentrated sulfuric acid reaction mixture an aqueous slurry of residues separated from a solution obtained by dissolution of the reaction mass resulting from a previous reaction of ground titaniferous ore and concentrated sulfuric acid and as a consequence of the resultant dilution of the concentrated sulfuric acid thereby raising the temperature of the mixture, and thereafter supplying additional heat to initiate the reaction between ore and acid, the proportions of ore, concentrated acid and slurry being such that a non-fluid reaction mass is obtained.

3. Method for solubilizing titaniferous ores which comprises heating ground titaniferous ore with concentrated sulfuric acid, dissolving the resulting reaction mass in aqueous media, separating undissolved residues from the resultant solution, hydrolyzing the solution, admixing the separated residues with sufficient of the spent acid hydrolysis mother liquor to form a free-flowing slurry and returning a major portion of said residues so slurried to a subsequent ore-concentrated acid mixture prior to initiating the reaction between the said ore and concentrated acid, the proportions of ore, concentrated acid and slurry being such that a non-fluid reaction mass is obtained.

4. Method for solubilizing titaniferous ores which comprises heating ground titaniferous ore with concentrated sulfuric acid, dissolving the resulting reaction mass in aqueous media, separating undissolved residues from the resultant solution, hydrolyzing the solution, admixing the separated residues with sufficient of the spent acid hydrolysis mother liquor to form a free-flowing slurry and returning an amount of said slurry to a subsequent ore-concentrated acid mixture prior to initiating the reaction between the said ore and concentrated acid, the acid strength of the resulting mixture being so controlled as not to be below about 85 per cent $H_2SO_4$ and the proportions of ore, concentrated acid and slurry in said mixture being such that a non-fluid reaction mass is obtained.

5. Method for solubilizing titaniferous ores which comprises heating ground titaniferous ore with concentrated sulfuric acid, dissolving the resulting reaction mass in aqueous media, separating undissolved residues from the resultant solution, forming a free-flowing slurry of said residues with dilute sulfuric acid and returning said slurry to a subsequent ore-concentrated acid mixture prior to initiating the reaction between the said ore and concentrated acid, the proportions of ore, concentrated acid and slurry being such that a non-fluid reaction mass is obtained.

6. Method for solubilizing titaniferous ores which comprises heating ground titaniferous ore with concentrated sulfuric acid, dissolving the resulting reaction mass in aqueous media, separating undissolved residues from the resultant solution, forming a free-flowing aqueous slurry of said residues, and returning said slurry to a subsequent ore-concentrated acid mixture prior to initiating the reaction between the said ore and concentrated acid, the proportions of ore, concentrated acid and slurry being such that a non-fluid reaction mass is obtained.

WALTER G. MORAN.